US007063216B2

(12) United States Patent
Lane et al.

(10) Patent No.: US 7,063,216 B2

(45) Date of Patent: Jun. 20, 2006

(54) UNDERDRAIN USEFUL IN THE CONSTRUCTION OF A FILTRATION DEVICE

(75) Inventors: Joseph P. Lane, Methuen, MA (US); Louis L. Bonhomme, Waltham, MA (US); Douglas A. Boucher, Billerica, MA (US); Richard T. Burnham, Gloucester, MA (US); Kenneth G. Desilets, Westford, MA (US); Luc Lirot, Steige (FR); Stéphane Jean Marie Olivier, Rosheim (FR); Steven D. Sheridan, Wakefield, MA (US)

(73) Assignee: Millipore Corporation, Billerica, MA (US)

( * ) Notice: Subject to any disclaimer, the term of this patent is extended or adjusted under 35 U.S.C. 154(b) by 398 days.

(21) Appl. No.: 10/655,052

(22) Filed: Sep. 4, 2003

(65) Prior Publication Data

US 2005/0051471 A1 Mar. 10, 2005

(51) Int. Cl.
*B01D 63/00* (2006.01)
*B01D 24/42* (2006.01)
*B01D 29/92* (2006.01)

(52) U.S. Cl. ................. 210/466; 210/321.72; 210/464; 210/467; 210/468; 210/455; 422/101; 422/102

(58) Field of Classification Search ..................... None
See application file for complete search history.

(56) References Cited

U.S. PATENT DOCUMENTS

| | | | | |
|---|---|---|---|---|
| 4,427,415 | A | 1/1984 | Cleveland | 436/57 |
| 4,902,481 | A | 2/1990 | Clark et al. | 422/101 |
| 4,948,564 | A | 8/1990 | Root et al. | 422/101 |
| 5,108,704 | A | 4/1992 | Bowers et al. | 422/70 |
| 5,141,719 | A | 8/1992 | Fernwood et al. | 422/101 |
| 5,181,632 | A * | 1/1993 | Latter | 222/153.06 |
| 5,264,184 | A | 11/1993 | Aysta et al. | 422/101 |
| 5,464,541 | A | 11/1995 | Aysta et al. | 210/767 |
| 6,159,368 | A | 12/2000 | Moring et al. | 210/321.75 |
| 6,290,108 | B1 * | 9/2001 | Gross | 222/494 |
| 6,309,605 | B1 | 10/2001 | Zermani | 422/101 |
| 6,338,802 | B1 | 1/2002 | Bodner et al. | 210/65 |
| 6,365,871 | B1 | 4/2002 | Knowles et al. | 219/121.7 |
| 6,419,827 | B1 | 7/2002 | Sandell et al. | 210/321.75 |
| 6,514,463 | B1 | 2/2003 | Zermani | 422/101 |
| 2002/0104795 | A1 | 8/2002 | Cote et al. | 210/323.2 |
| 2002/0155034 | A1 | 10/2002 | Perman et al. | 422/101 |
| 2002/0195386 | A1 | 12/2002 | Young et al. | 210/455 |
| 2003/0066821 | A1 | 4/2003 | Wybrow et al. | 219/121.71 |
| 2003/0066839 | A1 * | 4/2003 | Connors et al. | 220/713 |

FOREIGN PATENT DOCUMENTS

| | | |
|---|---|---|
| DE | 10041825 | 3/2002 |

(Continued)

*Primary Examiner*—Krishnan S. Menon
(74) *Attorney, Agent, or Firm*—Millipore Corporation

(57) ABSTRACT

The present invention provides an underdrain having an improved spout. The underdrain has particular utility in the construction of both single-well and microarray filtration devices. In a principal embodiment, the underdrain is characterized by its incorporation of a straight-walled, roughly-textured spout, the spout being provided with microhole(s) at a terminal end thereof for the discharge of fluid conducted through the underdrain. An array comprising several of such underdrains can be mated with a corresponding array of wells, with separation material (e.g., membrane material) provided therebetween. The resultant microarray filtration device can be used for conducting several fluid assays contemporaneously with, for example, good "pendant drop" control and low "cross-talk".

11 Claims, 3 Drawing Sheets

FOREIGN PATENT DOCUMENTS

| | | |
|---|---|---|
| WO | WO97/15394 | 5/1997 |
| WO | WO99/34920 | 7/1999 |
| WO | WO01/45844 | 6/2001 |
| WO | WO01/51206 | 7/2001 |
| WO | WO02/096563 | 12/2002 |

* cited by examiner

UNDERDRAIN USEFUL IN THE CONSTRUCTION OF A FILTRATION DEVICE

FIELD

In general, the present invention is directed to an underdrain useful for filtration, and more particularly, to an underdrain useful in the construction of microarray filtration devices.

BACKGROUND

Chemistry on the microscale, involving the reaction and subsequent analysis of reagents or analytes in microliter volumes or smaller, is an increasingly important aspect of the study and/or development of substances in the pharmaceutical and other industries. In certain instances, the reagents or analytes are scarce or otherwise not easily obtainable. In other instances, such as is prevalent in biopharmaceutical research, the analytical objectives sought call for the extraction of a vast library of information from a correspondingly vast number of assays. In either instance—whether by necessity (as in the former) or as a practical matter (as in the latter)—microscale chemistry provides apparent and distinct advantages.

Often in biopharmaceutical research, an assay, as part of its protocol, requires a fluid filtration step, for example, to either purify or isolate a particular biochemical target. For conducting several of such assays contemporaneously, so-called "multiwell plates" have become the tool of choice. These are now mass produced in consistent, pre-packaged, pre-sterilized kits obtainable easily from several commercial venues (e.g., Millipore Corporation of Billerica, Mass.). They are generally fast, easy to use, comparatively inexpensive, and amenable to automated robotic processes.

Multiwell plates are frequently used, for example, to incubate respective microcultures or to separate biological or biochemical material followed by further processing to harvest the material. Each well in a typical multiwell plate is provided with separation material so that, upon application of suitable force (e.g., a vacuum) to one side of the plate, fluid in each well is expressed though the filter, leaving solids, such a bacteria and the like, entrapped therein. The separation material can also act as a membrane such that the predetermined target is selectively bonded or otherwise retained. The retained target can thereafter be harvested by means of a further solvent. The liquid expressed from the individual wells through the separation material can be collected in a common collecting vessel (e.g., in instances wherein the liquid is not needed for further processing), or alternatively, in individual collecting containers.

Existing multiwell plates are often manufactured in 6-well, 96-well, 384-well, and 1536-well formats, each well typically having a predetermined maximum volume capacity ranging between approximately 1 microliter to approximately 5 milliliters. Typically, each well in a multiwell plate is provided with a corresponding underdrain downstream of the separation material. The underdrain—often provided with a spout—essentially controls or otherwise affects the nature of and manner in which fluid is discharged out each well.

Multiwell plates having underdrains with spouts are disclosed, for example, in U.S. Pat. No. 4,902,481, issued to P. Clark et al., on Feb. 20, 1990; U.S. Pat. No. 5,264,184, issued to J. E. Aysta et al. on Nov. 23, 1993; U.S. Pat. No. 5,464,541, issued to J. E. Aysta et al. on Nov. 7, 1995; U.S.

Pat. No. 5,108,704, issued to W. F. Bowers et al. on Apr. 28, 1992; U.S. Pat. App. Pub. No. 2002/0,195,386, filed by S. G. Young et al. on Jun. 25, 2002; U.S. Pat. No. 4,948,564, issued to D. Root et al. on Aug. 14, 1990; U.S. Pat. App. Pub. No. 2002/0,155,034, filed by C. A. Perman on Jun. 11, 2002; U.S. Pat. No. 6,338,802, issued to K. S. Bodner et al. on Jan. 15, 2002; U.S. Pat. No. 6,159,368, issued to S. E. Moring et al. on Dec. 12, 2000; U.S. Pat. No. 5,141,719, issued to G. C. Fernwood et al. on Aug. 25, 1992; U.S. Pat. No. 6,391,241, issued to R. A. Cote et al. on May 21, 2002; U.S. Pat. App. Pub. No. 2002/0,104,795, filed by R. A. Cote et al. on Mar. 28, 2002; U.S. Pat. No. 6,419,827, issued to D. R. Sandell et al. on Jul. 16, 2002; PCT International Patent Application Pub. No. WO 02/096563, filed by J. Kane et al. on May 29, 2002; PCT International Patent Application Pub. No. WO 01/51206, filed by T. Vaaben et al. on May 8, 2000; and PCT International Patent Application Pub. No. WO 01/45,844, filed by K. A. Moll on Dec. 21, 2000.

While these and other multiwell plates are still widely used, need is felt for both structural and functional improvements thereto. Areas of particular interest include, but are not limited to, the control of so-called "pendant drop formation", cross-talk between wells, and robotic automation. In particular, as known by those skilled in the art, fluid is often expressed (intentionally or not) through a multiwell plate in drops. The nature of drop formation will affect the conduct of robotic automation, for example, the speed, precision, and sensitivity thereof. Undesirable drop formation and dripping can lead, for example, to sample loss, leakage, splattering, cross contamination (i.e., cross talk), and the like. Loss of information, diagnostic failures, and other (potentially catastrophic) inaccuracies can result.

SUMMARY

The present invention provides an underdrain having an improved spout. The underdrain has particular utility in the construction of both single-well and microarray filtration devices. The underdrain spout, when fixed onto the bottom of a well of a filtration device, reduces undesirable and/or untimely leakage of fluid contained in the well. This leakage could otherwise occur, for example, during the filling of the wells, and the subsequent transport and/or incubation thereof.

In a particular embodiment, the underdrain has a monolithic structure that—on account of its structural features on its upstream side—is capable of being fixed onto the bottom of a well with separation material substantially therebetween. The resultant filtration device provides a flow path wherein fluid placed in the well is capable of flowing first into and through the separation material, then into and ultimately out of the underdrain. The flow of fluid out of the underdrain occurs through a spout provided on the underdrain's downstream side. The spout comprises an inner side surface, an outer side surface, and a floor having an inner end surface and an outer end surface. The inner side surface defines a fluid pathway through said spout that runs substantially along the spout's central axis. The fluid pathway terminates downstream at the inner end surface of said spout floor, whereat at least one microhole is provided therethrough or therearound. Preferably, the outer side surface will run substantially parallel with the spout's central axis (cf., a "straight wall spout"), and its outer end and side surfaces will have a coarse microstructure that renders said surfaces more water repellant.

In light of the above, it is a principal object of the present invention to provide an underdrain having a spout for the discharge of fluid therefrom.

It is another object of the present invention to provide an underdrain having a spout through which fluid can be expressed through a microhole (or microholes) provided through or around a terminal end (i.e., a floor) of said spout.

It is another object of the present invention to provide an underdrain having a spout with a straight side wall, a coarse outer surface microstructure, and a microhole (or microholes) provided through or around a terminal end thereof through which fluid can be expressed.

It is another object of the present invention to provide an underdrain having a spout through which fluid can be expressed through a pattern of microholes provided through or around a terminal end of said spout, and wherein the terminal end is formed as a light-transmissive optical element in a region thereof not provided with microholes.

It is another object of the present invention to provide a micro-array filtration device comprising an upper micro-well plate comprising an array of wells, a lower underdrain plate comprising a complementary array of underdrains, and separation material provided expansively or discretely between said wells and said underdrains.

It is another object of the present invention to provide a 96-well microarray filtration device having improved means for controlling fluid expressed therethrough.

It is another object of the present invention to provide a 384-well microarray filtration device having improved means for controlling fluid expressed therethrough.

It is another object of the present invention to provide a microarray filtration device comprising an array of wells, each well having an underdrain formed continuously therewith, each underdrain having a spout, each spout having a spout floor with at least one microhole provided therethrough or therearound.

For a further understanding of the nature and objects of the invention, reference should be had to the following description taken in conjunction with the accompanying drawings.

BRIEF DESCRIPTION OF THE DRAWINGS

The illustrations in each of FIGS. 1 to 5 are schematic. The relative locations, shapes, and sizes of objects are exaggerated to facilitate discussion and presentation herein.

DETAILED DESCRIPTION

The present invention provides an underdrain suitable for use, for example, within the assemblage of "single well" or so-called "microarray"-type filtration devices. The underdrain (or an array thereof) is structured to enable the fixation thereof—permanently or not—onto the bottom of a well (or an complementary array thereof) with separation material (e.g., a membrane) interposed substantially therebetween, such that the resultant structure (i.e., a filtration device) provides a flow path wherein fluid placed in a well is flowable first into and through the separation material, then into and ultimately out of its complementary underdrain.

The underdrain can be characterized as being structured about a planar support 150, with a distinct upstream topography figuratively rising above the plane, and an equally distinct downstream topography figuratively hanging below the plane. The structures above and below—which together with the planar support 150 form a unitary monolithic structure—are not arbitrary, but specifically engineered with certain specific predetermined functions in mind. While said predetermined functions, and consequently said structures, will vary considerably in practice, in accord with present invention, the upstream side of the underdrain herein will provide at the least structure(s) enabling fixation of the underdrain to the well, and the downstream side will provide at the least structure(s) enabling discharge of fluid out of the underdrain.

The means for engaging a well that are provided on the upstream side of the underdrain are not bound to any particular structural configuration. Those skilled in the art will appreciate the variety of currently-available microarray well plate formats—a representative sampling of which can be found in the patent references cited in the Background, above. Since wells vary in structural design, the manner and means by which the underdrain of the present invention will engage therewith will also vary. Regardless, in all cases, the means for engagement will be engineered to provide or facilitate the formation of a reasonably water-tight seal between the well and the underdrain. Desirably, the means for engagement should also incorporate means for aligning or guiding the well—such as by bevels, tracks, notches, pins, and the like—into appropriate registration with the underdrain during assembly.

While the "upstream" side of the underdrain and its well engaging means are important, the key advantages of the present invention arise from novel structural elements (and combinations thereof) provided in the downstream side. In particular, a principal feature of the underdrain—as illustrated schematically in FIG. 1—is the unprecedented structure of the underdrain's downstream discharge spout 10.

Figure 2A:
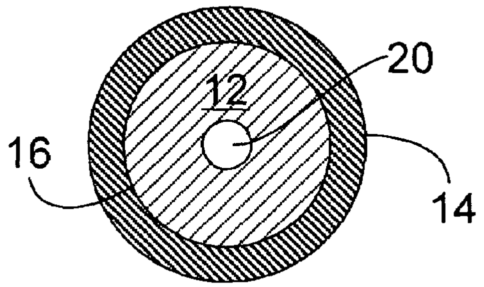
FIGS. 2*a* to 2*d* illustrate, within the parameters of the present invention, several patterns of microholes 20 that can be provided through spout floor 19, as viewed downstream into said spout.

Spout 10's structure is well-suited for achieving good control over the discharge of fluid from the underdrain, and in particular, militating against undesired pendant drop formation and related "creep up" phenomena. Spout 10's configuration comprises an inner side surface 16, an outer side surface 14, and a floor 19 having an inner and outer end surface 12 and 22. The inner side surface 14 is formed to define a fluid pathway 18 through said spout 10 that runs substantially along the spout 10's central axis A—A. The fluid pathway terminates downstream at the inner end surface 12. And most importantly, the spout floor 19 has at least one microhole provided either therethrough (cf., FIGS. 2*a* and 2*b*) or therearound (cf., FIGS. 2*c* and 2*d*).

Preferably, the spout 10 will have comparatively thin side walls, to reduce spout 10's overall outside diameter and/or lateral thickness, and thereby promote good pendant drop formation.

While applicants do not wish to be bound to any theory used in explanation of the present invention, it is currently felt that good pendant drop control is accomplished because, although fluid can still be expressed from the underdrain through the microhole(s) upon, for example, the application of vacuum, the inner end surface essentially provides better support for fluid contained in the underdrain in the absence of said external force. Those skilled in the art will appreciate that several factors (e.g., physical, chemical, rheological, and the like) participate and/or influence the formation of pendant drops. Accordingly, the particular configuration (e.g., dimensions, number, materials, etc.) of the microhole(s) and end surface should be selected, for example, in light of the viscosity and surface tension of the intended fluid charge, as well as the nature and extent of the driving forces (e.g., upstream air pressure, gravity, centrifugal, mechanical, downstream vacuum, etc.) to be used to express fluid out of a filtration device through the underdrain.

Aside from the microholes, further control over pendant drop formation is afforded in the underdrain by forming the spout with a straight outer side wall or walls (as may be the case in non-cylindrical spouts) having a roughly textured outer surface.

Figure 1:
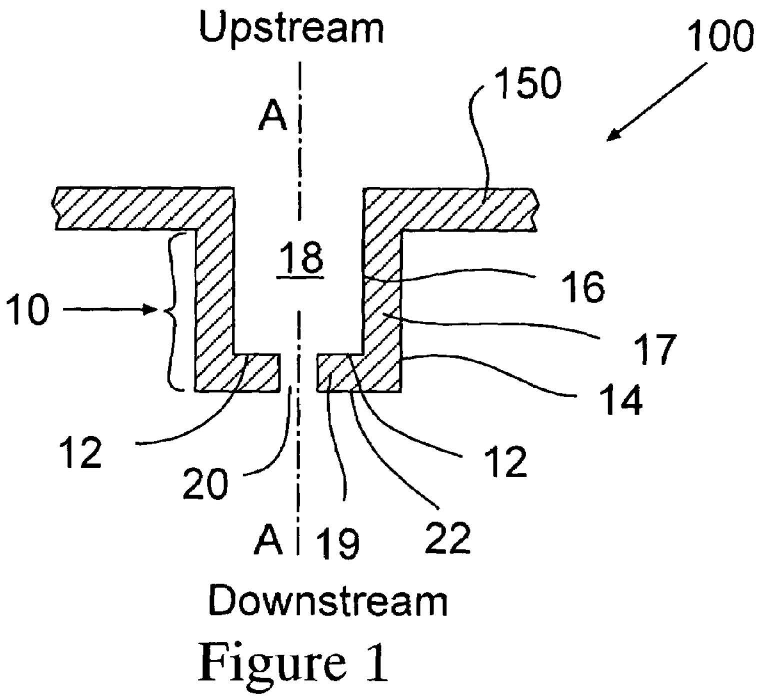
FIG. 1 illustrates in partial view an underdrain 100 having a spout 10 provided with a microhole 20 through spout floor 19 according to an embodiment of the present invention.

A spout 10 having a straight side wall is illustrated in FIG. 1. As shown therein, the outer side wall 14 of spout 10 runs substantially parallel to central axis A—A, said central axis generally corresponding to the flow path through the spout 10. In a typical application—such as the application of a microarray filtration device onto a vacuum manifold—the outer side wall(s) 14 of spout 10 will also be substantially parallel to the direction in which fluid is expressed out of the spout 10 into a receiving element. This—it is felt—provides distinct advantage. As a drop of fluid forms on the tip of a spout, prior to falling off, it is gravitationally more difficult for said drop to contact and creep significantly up a steep straight side wall than would be the case, for example, with a gradual upward and outwardly inclined side wall.

In order to realize the advantages offered by the straight side wall, the length of said wall should be fairly substantial. While it is not required that the entire length of the outer side surface 14 of spout 10 be straight as shown in FIG. 1 (but cf., FIG. 3), little advantage is offered where the straight side walls occupies, for example, only the rim of the spout. While there is no particular absolute “cut off” in respect of length, it is envisaged that in most circumstances, the outer side surface will 14 run substantially parallel to the central axis A—A of the spout (i.e., “straight”) from its furthest downstream end to at least a point corresponding to midway the spout 10’s fluid pathway 18 (i.e., as said pathway is defined herein).

A further impediment to pendant drop up-crawl is provided by the roughly textured outer side and end surfaces 14 and 22 of the spout 10. It will be appreciated that the spout may likely be already made of (or coated with) a polymeric material that inherently possesses some measure of hydrophobicity. It is currently believed that a roughly textured outer surface—which in accordance with the present invention comprises a coarse microstructure of cracks, crevices, pits, ridges, bumps, and/or like peaks and valleys—can enhance this inherent hydrophobicity, by disrupting, reducing, and/or rendering more tortuous the surface area(s) upon which a drop of aqueous fluid could otherwise “crawl” (for example, by capillary action). Although one could have expected the opposite effect (i.e., hydrophilicization), repeatable and consistent empirical data were collected validating the positive effect of a roughened spout surface on pendant drop formation.

The coarse microstructure can be provided on the spout either during the forming of the underdrain (for example, by use of an appropriately roughly textured mold), or subsequently, by well-known mechanical and chemical surface roughening processes. Mechanical processes include, but are not limited to, embossing, etching, and treatment with abrasives. Chemical processes include, but are not limited to, treatment with caustic, acidic or other corrosive solutions, thermal and/or photodegradation, and laser ablation.

To achieve the best results, in the practice of the present invention, it is preferred that the underdrain assembly combine all the features of: the microhole(s), the straight outer wall, and the coarse surface microstructure. However, for certain applications, acceptable results may be obtained from an embodiment of the present invention wherein the straight wall and coarse surface microstructure features are employed without reliance on a microhole feature. In this regard, although the omission of the microhole feature may lead to reduced functional advantage, possible manufacturing costs may be reduced by the elimination of microhole manufacturing steps.

In another alternative embodiment, a monolithic microarray filtration device is contemplated wherein the wells and underdrains thereof are not formed separately, then assembled. Rather, each well in said monolithic microarray filtration device is provided with an underdrain that is formed continuously therewith. Separation material can be installed within the device, for example, in the same manufacturing step (or steps) in which the underdrain-bearing well is formed, and such that, in the resultant monolithic microarray filtration device, the flow path of fluid therethrough will be essentially the same as the flow path provided by a two-piece construction. In accord with the invention, the co-formed underdrain is provided with appropriate microhole technology, and also, if desired, a straight outer side wall and/or a roughly-textured outer surface.

Although the monolithic microarray filtration device cannot be easily separated like the two-piece construction for inspection and analysis of enclosed separation material, it tends to be more structurally robust, and is better suited for robotic handling, and is less likely to leak, and is less vulnerable to interwell cross-talk.

In respect of materials and methods, the underdrain will generally be formed monolithically (i.e., as a single, homogenous, unitary, unassembled piece) from polymeric material, for example, by well-known injection molding or like processes.

Examples of suitable polymeric material include, but are not limited to, polycarbonates, polyesters, nylons, PTFE resins and other fluoropolymers, acrylic and methacrylic resins and copolymers, polysulphones, polyethersulphones, polyaryl-sulphones, polystryenes, polyvinyl chlorides, chlorinated polyvinyl chlorides, ABS and its alloys and blends, polyurethanes, thermoset polymers, polyolefins (e.g., low density polyethylene, high density polyethylene, and ultrahigh molecular weight polyethylene and copolymers thereof), polypropylene and copolymers thereof, and metallocene generated polyolefins. Preferred polymers are polyolefins, in particular polyethylenes and their copolymers, polystyrenes, and polycarbonates.

When an underdrain and well plate are used in combination they may be made of the same polymer or different polymers. Likewise, the polymers may be clear or rendered optically opaque. When using opaque materials, it is sometimes preferred that their use be limited to the side walls so that one can use optical scanners or readers inspect in situ various characteristics of the retentate.

The use of light transmissive materials afford the possibility of forming or otherwise integrating optical elements and/or functionality into the design of the underdrain. For example, as suggested in FIG. 2*c*, a region 22 of the spout floor not occupied by any microholes can be shaped in the form of, for example, a concave, convex, spherical, or cylindrical lens. An integrated optical element can assist, enable, and or facilitate the optical identification, monitoring, detection, or analysis of the underdrain, its component parts, and/or its fluid charge, or retained or filtered constituents thereof. Preferred optical polymers include, but are not limited to, styrene, styrene acrylonitrile, and acrylics. Optical attenuation, if desired, can be achieved in said optical elements, for example, by the inclusion of pigments, dyes, and other light absorbing materials.

The inner side surface 16 of spout 10 preferably defines a fluid pathway 18 that is preferably circular, or substantially so, in its lateral cross-section. (See e.g., FIGS. 2*a* to 2*d*.) In such instance, the inner side surface 16 of spout 10 will comprise a single cylindrical surface. It is contemplated, however, that in certain embodiments, the inner side surface of spout 10 may be formed such that its lateral cross-section will have multiple sides, for example, multiple flat sides in the form of a pentagon, hexagon, heptagon, or octagon, or a combination of flat and arcuate sides. Since the present invention is not bound to any particular number of surfaces that may independently or collectively constitute the "inner side surface" 16, no such limitation should be assumed in construing that terms as it is used herein.

As shown in FIGS. 2*a* to 2*d*, variability is available in the design of the microhole in the floor 19 of spout 10. At the outset, the microhole component in the floor 19 of the spout 10 may consist of a single microhole or comprise several dispersed microholes. For example, in FIG. 2*a*, a single microhole 20 is centrally positioned through the inner end surface 12 of spout floor 19. In comparison, in FIG. 2, a plurality of microholes 20 is employed, the aggregate also being roughly centrally positioned.

Figure 2B:
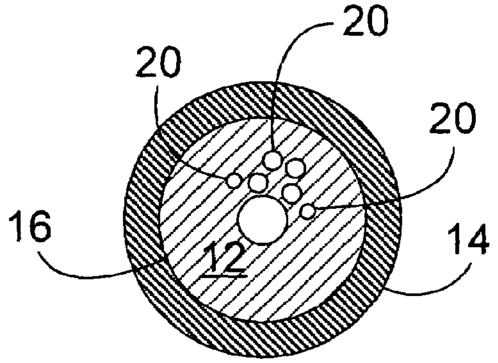

Although in FIG. 2*b* the microholes 20 are shown to be of different sizes and randomly scattered, this is not intended to be a limitation of the invention. A more orderly pattern of microholes (e.g., binomial arrays; radiating, spiral, and quincuncial patterns; etc.) and/or microholes of substantially similar dimensions can be employed. Likewise, although circular microholes are shown in FIGS. 1 and 2, the invention is not particularly limited in respect of the geometrical shape of the microhole 20. Diverse polygonal shapes—including notches, grills, and the like—are contemplated.

Figure 2C:
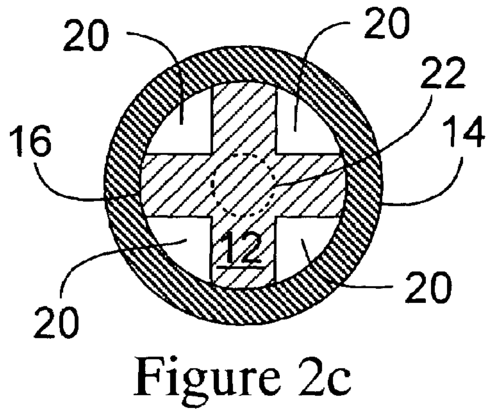
Figure 2D:
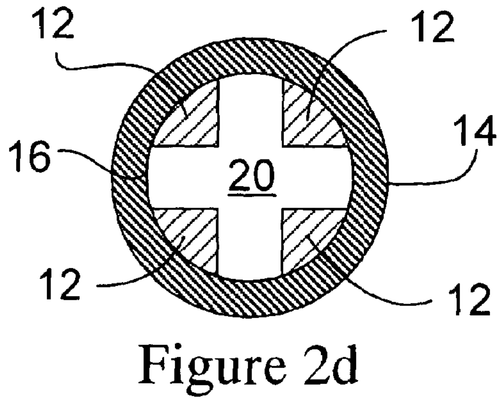

It is not a limitation to the invention that the microhole (or microholes) be provided literally through the spout floor 19, i.e., such that the microhole (or microholes) are surrounded completely by the material of said spout floor 19. As shown in FIGS. 2*c* and 2*d*, microholes 20 can be configured in a manner wherein their extents—at least in respect of certain sides thereof—are co-extensive with the extents of the inner end surface 12 of spout floor 19. In this regard, to the extent that said microholes can be argued to not literally go "through" the spout floor 19, they nonetheless—in accord with both the definition of the present invention and its objectives—clearly go "around" said spout floor 19.

The microholes provided in the bottom of the spout may be centered a lateral distance away from the centerline of the well. Placing the microholes at the periphery of the wells enables unbound debris to pass through the filter, as well as provide space for an optical quality lens at the bottom of each well (see, e.g., region 22 in FIG. 22*c*). Such lens may be used to transmit photon energy through the bottom of the plate's underdrain toward optical sensors. Such feature can improve the sensitivity and effectiveness of assays by enabling, for example, fluorescence to be read from the both the top and bottom of the filtration device.

Microhole(s) can be provided by a numbers of mechanical processes, for example, a molding process using a core pin; or a machining process using a rotary drill or end-mill tool. Regardless, it is vastly more preferable—particularly in respect of costs, speed, size, consistency of results, and ability to produce well-defined, sharp-edged microholes—to implement well-known laser ablation methodologies. See e.g., R. Srinivasan et al., "Mechanism of the Ultraviolet Laser Ablation of Polymethyl Methacrylate at 193 and 248 nm: Laser-induced Fluorescence Analysis Chemical Analysis, and Doping Studies", J. Opt. Soc. Am. B, vol. 3, No. 5 (May 1986), p. 785; R. Srinivasan et al., "Ablative Photodecomposition of Polymer Films by Pulsed Far-Ultraviolet (193 nm) Laser Radiation: Dependence of Etch Depth on Experimental Conditions", J. Pol. Science, vol. 22, p. 2601 (1984); B. J. Garrison et al., "Laser Ablation of Organic Polymers: Microscopic Models for Photochemical and Thermal Processes", J. Appl. Phys., 57 (8), p. 2909 (Apr. 15, 1985); J. T. C. Yeh, "Laser Ablation of Polymers", J. Vac. Sci. Technol. A 4 (3), p. 653 (May/June 1986); R. Srinivasan et al., "Photochemical Cleavage of a Polymeric Solid: Details of the Ultraviolet Laser Ablation of Poly(Methyl Methacrylate) at 193 and 248 nm", Macromolecules, vol. 19, p. 916 (1986); and B. Braren et al., "Optical and Photochemical Factors which Influence Etching of Polymers by Ablative Photodecomposition", J. Vac. Sci. Technol. B 3 (3), p. 913 (May/June 1985).

In general, ablation is a process by which ultraviolet radiation having wavelengths less than 400 nm, for example, are used to decompose certain materials by electronically exciting the constituent bonds of the material, followed by bond-breaking and the production of volatile fragment materials which evaporate or escape from the surface. These photochemical reactions are known to be particularly efficient for wavelengths less than 200 nm (i.e., vacuum ultraviolet radiation), although wavelengths up to 400 nm have been used. In ablative photodecomposition, the broken fragments carry away kinetic energy, thus preventing the energy from generating heat in the substrate.

In manufacturing underdrains according to the present invention, it was found that excimer-laser ablated microholes can be provided with an approximately 3 to approximately 8 degree taper from the initially cut surface to the final cut surface. This taper affect occurs due to internal reflection of the laser beam within a microhole. This feature tends to create a rounded surface at the initial cut surface, which helps smooth the transition of flow through the bottom of a multi-well plate.

Tapered microholes at the bottom of a well can also reduce the adverse effects of so-called "vena contracts" fluid flow. Vena contracts occurs when a fluid passes through an orifice hole. As fluid rushes though a hole, momentum is transferred to surrounding fluid such that fluid flows perpendicularly along the wall of the vessel toward the discharge hole. When the perpendicular flow meets the axial flow, the effective cross-sectional area of flow is smaller than the physical hole that is present.

In an underdrain for most currently available and popular microarray filtration device formats (e.g., 96-well and 384-well arrays), when a single microhole is used, the microhole can be as large as approximately 0.75 mm in diameter, and can be as small as 0.02 mm in diameter. When several microholes are employed, they will collectively occupy the same, slightly more, or less area as the upper single microhole limit.

To facilitate laser ablation methodologies, the thickness of the spout floor 19 at the terminus of the fluid pathway 18 is desirably kept as thin as possible to reduce the amount of energy and time needed for the ablation thereof. As is known in the art, the material can also include dopants to affect similar advantages, for example, by changing the material's absorptivity. Either an excimer or a $CO_2$ laser can be used, but the former is preferred.

Figure 3:
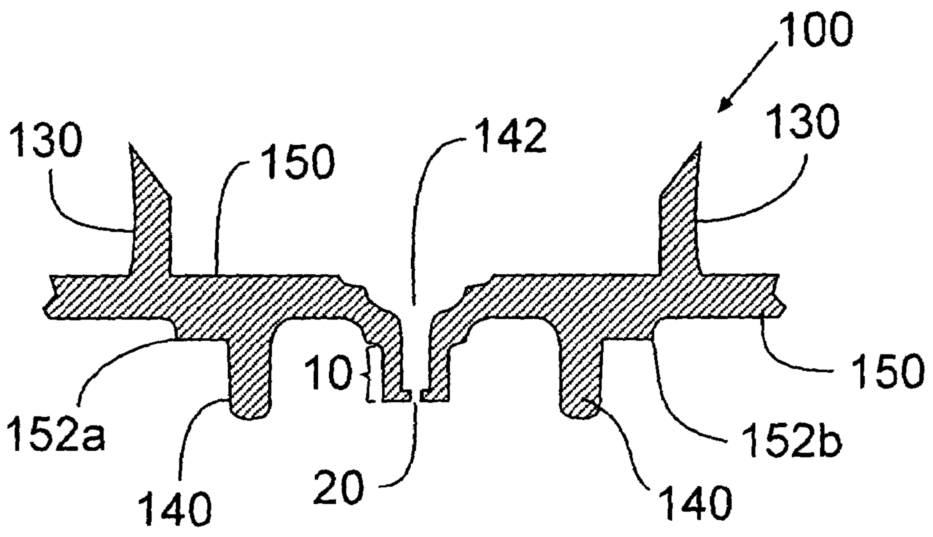
FIG. 3 illustrates an underdrain 100 according to a particular embodiment of the present invention.

FIG. 1 and FIG. 2 both illustrate the invention along its broad contours. FIG. 3, in contrast, illustrates the inventive underdrain according to a specific embodiment thereof. As shown in cross-section therein, the underdrain 100—having a monolithic construction—is provided with certain structural features above and below (i.e., upstream and downstream, respectively) a planar support 150. These structural features substantially encircle (or otherwise surround) a central funnel-shaped opening 142 that leads into and through the planar support 150.

On the downstream surface of the planar support 150, there is provided a tube-shaped spout 10 with microhole 20 aligned co-axially with and below the funnel-shaped opening 142, a protective circular collar 140 co-axially surrounding the tubular spout 10, and a plurality of spacers 152*a* and 152*b* formed between the lower surface of the planar support 150 and the outer wall of the protective circular collar 140. On the upstream surface of the planar support 150 there is provided circular engaging means 130 for fixing a well to the underdrain 100, the circular engaging means being aligned co-axially with and above the funnel-shaped opening 142.

Funnel-shaped opening 142 provides a gradual transition for fluid to flow from a comparatively more spacious well (e.g., well 310 in FIG. 4) into the much more constricted fluid pathway of spout 10. As shown in FIG. 3, the furthest downstream end of funnel-shaped opening 142 merges smoothly into fluid pathway 18 of tubular spout 10, at which point the diameter of opening 142 is equal to that of fluid pathway 18. In practice, the diameter of the fluid pathway 18 should be sufficiently small, such that—with the combined influence of the material surface properties of the underdrain 100—fluid within funnel-shaped opening 142 (and hence, fluid within a filtration device 15) will not flow therethrough until a sufficient predetermined driving force (e.g., vacuum pressure, centrifugal force, etc.) is attained.

The protective circular collar 140 serves a number of functions. For certain applications, the protective circular collar 310 serves as an alignment guide, which is useful in instances wherein underdrain 100 is to be aligned with a downstream fluid receptacle. In this regard, the protective circular collar 140 is formed to enable the nesting thereof within the corresponding receptacle into which filtrate is to be transferred downstream. Lateral movement of the fluid receptacle is repressed by the protective circular collar which is generally tightly seated within said receptacle.

For applications not involving a fixed downstream fluid receptacle—e.g., wherein filtrate is not collected, but discharged as waste—the protective circular collar 310 serves also to minimize any contamination between wells and/or surrounding areas by guarding against aerosols or the splashing of the liquid filtrate as it is dispensed through the spout 10.

Further still, the protective circular collar 140 can be constructed such that its protrudes from planar support 150 to an extent further than the tubular spout 10, thus offering some measure of physical protection to the tubular spout 10 from damage that may be encountered during assembly, use, or possible disassembly of a filtration device 5.

Spacers 152*a* and 152*b*—though not immediately apparent from FIG. 3—are block-like structures that radiate outwardly from the outer wall of the protective circular collar 140. In addition to providing some lateral support to the protective circular collar 140, spacers 152*a* and 152*b* also prevent a lower corresponding fluid receptacle 46 from pressing completely up against planar support 150, and creating an air tight seal that would prevent or otherwise frustrate the evacuation of a fluid though the filtration device 5. Provision of intermittently positioned spacers provides air gaps, enabling the displacement of air throughout the device, as is needed, for example, in both vacuum- and centrifugally-driven filtration.

Well engaging means 130 on the upstream side of the planar support 150 is configured as an annular seat into which a well can be pushed into, in a manner comparable to the aforedescribed relationship between the protective circular collar 140 and the fluid receptacle 46. A well 310 is typically fixed within annular well-engaging means 150 by friction. However, for certain applications, one can use, for example, adhesives, thermal welds, or mechanically interlocking couplers. Preferably, unlike the protective circular collar, annular well engaging means 130 "fits" around the well 310's bottom end, rather than the well 310 fitting around the well engaging means 130.

The permanency of the fixation of a well 310 onto the underdrain 100 by said well engaging means 130 depends on intended use. For certain applications, advantage is realized by engineering the well-engaging means 150 such that the fixation of a well therewith is "sufficiently tight" to enable "clean" clinically-acceptable filtration, yet "sufficiently loose" to enable a relatively non-destructive disassembly of the resultant filtration device. Such disassembly, for example, can provide a practitioner additional avenues (not otherwise available) for observing, testing, or otherwise inspecting the separation material (e.g., a membrane) interposed between the mated well and underdrain. Such inspection often yields meaningful information.

Figure 4:
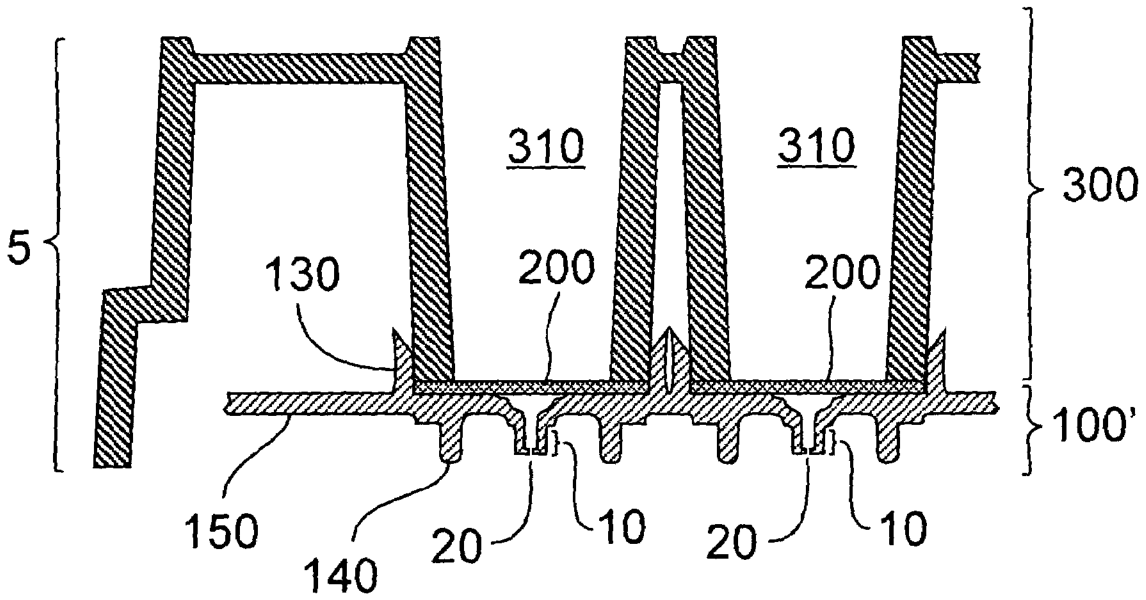
FIG. 4 illustrates a microarray filtration device 5 comprising an array 300 of wells 310, superposed over a complementary array 100' of underdrains, with separation material 200 interposed discretely therebetween.

As suggested supra, though present invention encompasses a single underdrain capable of being coupled (i.e., "fixed") to a single well, it is envisioned that in practice, in the manufacture of a filtration device, one will utilize an array of underdrains capable of being coupled in register to a corresponding array of wells. For example, as illustrated in FIG. 4, a microarray filtration device 5 is constructed of a plate 300 comprising a plurality of wells 310 and a plate 100' comprising a plurality of underdrains. In the microarray filtration device 5, each well 310 of the plate 300 is matched in a 1:1 ratio to each underdrain in plate 100'. Separation material is provided between plates 300 and 100', for example, in the form of several individual membranes 200 discretely interposed between each coupled well/underdrain pair.

Although in FIG. 4, the microarray filtration device 5 comprises a plate-like array of wells and a corresponding plate-like array of underdrains, the underdrains need not in all instances be provided collectively in one component. In particular, a filtration device is contemplated wherein discrete underdrains are individually "press fitted" onto the bottom end of the plate's wells.

When paired plate-like arrays of wells and underdrains are used, it is important that the wells of the first plate register with the underdrains of the second plate. Typically, as earlier indicated, multiwell plates can be made in formats containing 6-wells, 96-wells, 384-wells, or up to 1536-wells and above. The number of wells used is not critical to the invention. The wells are typically arranged in mutually perpendicular rows. For example, a 96 well plate will have 8 rows of 12 wells. Each of the 8 rows is parallel and spaced apart from each other. Likewise, each of the 12 wells in a row is spaced apart from each other and is in parallel with the wells in the adjacent rows. A plate containing 1536 wells typically has 128 rows of 192 wells.

Whether the underdrain is used for a microarray filtration device or a single-well filtration device, separation material 200—as earlier indicated—is placed substantially between the well(s) and the underdrain(s), such that fluid placed in a well is flowable first into and through the separation material 200, then into and ultimately out of the underdrain. The separation material can be any material specifically engineered for, and thus, capable of isolating, screening, binding, removing, or otherwise separating a predetermined target (e.g., viruses, proteins, bacteria, particulate matter, charged or otherwise labeled compounds, biochemical fragments, etc.) from a fluid stream passing therethrough. The determinants of separation can be based, for example, on the size, weight, surface affinities, chemical properties, and/or electrical properties of the predetermined target.

The separation material is preferably located at or close to the bottom of the well. Such placement—it is felt—can reduce incidence of so-called "vapor locking" that can occur when a well is repetitively filled and vacuum filtered.

The preferred separation material is a filtration membrane. The filtration membrane can be bonded to the well (or the underdrain) or can be held in position by being compressed between the well and the underdrain. Any bonding method can be utilized. Representative suitable membranes are the so-called "microporous" type made from, for example, nitrocellulose, cellulose acetate, polycarbonate, and polyvinylidene fluoride. Alternatively, the membranes can comprise an ultrafiltration membrane, which membranes are useful for retaining objects as small as about 100 daltons and as large as about 2,000,000 daltons. Examples of such ultrafiltration membranes include polysulfone, polyvinylidene fluoride, cellulose, and the like.

Aside from membranes, other separation materials include, depth filter media (such as those made from cellulosic or glass fibers), loose or matrix-embedded chromatographic beads, frits and other porous partially-fused vitreous substance, electrophoretic gels, etc. These separation materials—as well as membranes—can further comprise or be coated with or otherwise include filter aids and like additives, or other materials, which amplify, reduced, change, or otherwise modify the separation characteristics and qualities of the base underlying material, such as for example the grafting of target specific binding sites onto a chromatographic bead.

When incorporated into a microarray filtration device, the separation material can be interposed between the paired wells and underdrains either "expansively" (e.g., using one membrane sheet to cover all pairs) or "discretely" (e.g., using separate and discrete membranes for each pair). When the separation material is interposed expansively, care should be taken to minimize or otherwise frustrate fluid "cross-talk" between the pairs that can occur as fluid spreads laterally through the separation material, such as by using the well-known separations materials that are constructed specifically to contain (as in zones), mitigate, frustrate, or prevent lateral cross-flow.

When the separation material is interposed discretely between each well/underdrain pair, care should be taken to assure a good fit therein. In this regard, it is possible to cut a filter sheet by means of other cutting techniques, such as laser cutting, cutting by means of water jets, or by providing sharp edges circumscribing the bottom opening of the wells or circumscribing the upper opening of the underdrain. With respect to the latter, an appropriately-sized, well-fitting discrete filter element can be simultaneously punched out and appropriately positioned in each well/underdrain pair by placing an expansive sheet between the array of wells and the array of underdrains, and then pressing them tightly together. The sheet in this regard, can be initially bonded or secured to the array of wells, or the array of underdrains, or neither (i.e., loose).

Figure 5:
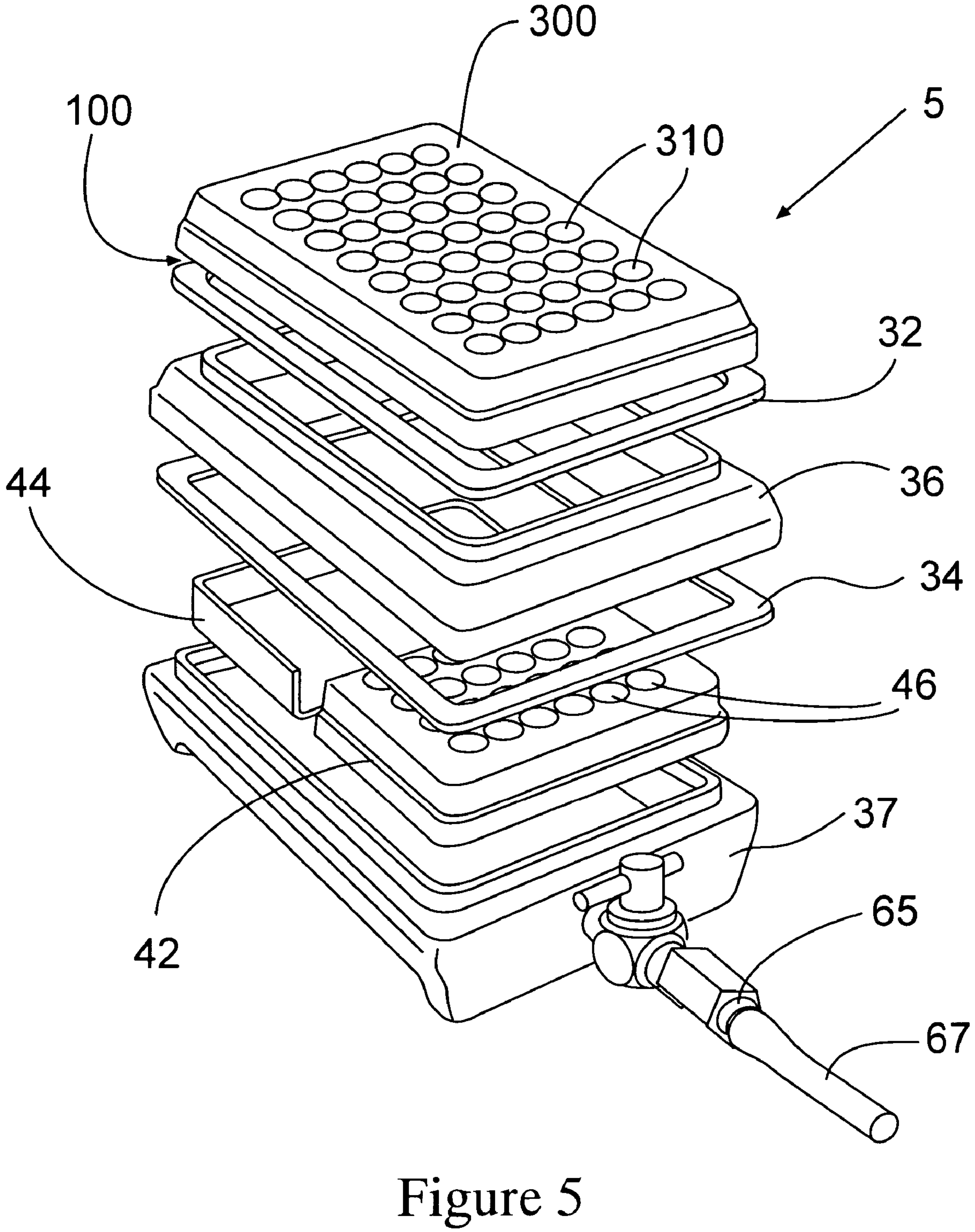
FIG. 5 illustrates the application of a microarray filtration device 5 onto a vacuum manifold 37.

In practice, after being charged with fluid samples, at the conclusion of all desired sample treatment procedures, microarray filtration device 5 is drained typically (though not necessarily) by drawing a vacuum through the device 5 such the fluid sample in each well 310 flows into and out of each respective underdrain 100 through separation material 200. An example of a vacuum manifold assembly suitable for such the conduct of such process is shown in FIG. 5. The vacuum manifold assembly of FIG. 5 comprises a base 37, which acts as a vacuum chamber and contains hose barb 65 for connection to an external vacuum source through hose 67. Positioned within the base 37 are liquid collection means such as either a collection tray 44 and/or a receiving plate 42 having a plurality of receptacles 46 for collecting fluid flowing out of each corresponding underdrain. The individual chambers 46 are associated each with a single well 310 in the well array 300 of the microarray filtration device 5. A microarray support 36 holding the microarray filtration device 5 above the fluid collection means is separated by gaskets 32 and 34 which form an airtight seal in the presence of a vacuum.

Although certain embodiments of the invention are disclosed, those skilled in the art, having the benefit of the teaching of the present invention set forth herein, can affect numerous modification thereto. These modifications are to be construed as encompassed within the scope of the present invention as set forth in the appended claims.

The invention claimed is:

1. An array of underdrains capable of being fixed onto the bottom of a plurality of wells with separation material substantially therebetween, thereby providing a flow path wherein fluid placed in the wells is flowable first into and through said separation material, then into and ultimately out of the underdrain;

the array of underdrains comprising a monolithic construction, and having an upstream side and a downstream side, said fixation to said wells being enabled proximate said upstream side, said flow of fluid out of said underdrain occurring proximate said downstream side;

the underdrain having a spout at said downstream side, the spout having a central axis and comprising an inner side surface, an outer side surface, and a floor having an inner and an outer end surface, the inner side surface defining a fluid pathway through said spout that runs substantially along said central axis, the fluid pathway terminating downstream at said inner end surface, said spout floor having a plurality of microholes provided therethrough or therearound where the plurality of microholes have diameters ranging from approximately 0.02 mm to approximately 0.76 mm and where the outer side surface of the spout runs substantially parallel with the central axis of the spout and wherein the outer side and end surfaces of said spout have a coarse microstructure formed by the use of an appropriately rough-textured mold, or by mechanical or chemical roughening.

2. The array of underdrains of claim 1, wherein said microholes have diameters approximately 0.76 mm.

3. The array of underdrains of claim 1, wherein said outer side surface runs substantially parallel to said central axis from its furthest downstream end to at least a point corresponding to midway said fluid pathway.

4. The array of underdrains of claim 3, wherein the distance along which said outer side surface runs parallel along said central axis from its furthest downstream end is within the range of approximately 0.5 mm to 5.0 mm.

5. The array of underdrains of claim 1, wherein the outer side surface of said spout has a coarse microstructure that enhances the chemically-inherent hydrophobicity of said outer side surface.

6. The array of underdrains of claim 1, wherein said array of underdrains comprises 96 individual underdrains arranged in an 8×12 array.

7. The array of underdrains of claim 1, wherein said array of underdrains comprises 384 individual underdrains arranged in a 16×24 array.

8. A microarray filtration device comprising an array of wells, wherein:

(a) each of said wells has an underdrain;

(b) separation material is provided discretely throughout such microfiltration device such that fluid placed in a well is flowable first into and through the separation material, then into and ultimately out of the underdrain of said well;

(c) each underdrain has an upstream end and a downstream end, with a spout provided at said downstream end that enables said flowing of fluid out of said underdrain; and (d) each spout has a central axis and comprises an inner side surface, an outer side surface, and a floor having an inner and outer end surface, the inner side surface defining a fluid pathway through said spout that runs substantially along said central axis, the fluid pathway terminating downstream at said inner end surface, said spout floor having a plurality of microholes provided therethrough or therearound where the plurality of microholes have diameters ranging from approximately 0.02 mm to approximately 0.76 mm, and wherein the outer side and end surfaces of said spout have a coarse microstructure formed by the use of an appropriately rough-textured mold, or by mechanical or chemical roughening.

9. The microarray filtration device of claims 8, wherein each underdrain is formed continuously onto each well.

10. The microarray filtration device of claim 9, wherein said separation material is a membrane.

11. The microarray filtration device of 10, wherein each well has a predetermined maximum volume capacity within the range of approximately 1 milliliter to approximately 5 milliliters.

* * * * *